(12) United States Patent
Kobayashi et al.

(10) Patent No.: US 7,727,426 B2
(45) Date of Patent: Jun. 1, 2010

(54) EPOXY RESIN COMPOSITION

(75) Inventors: Kazumasa Kobayashi, Sodegaura (JP); Chiaki Asano, Tokyo (JP); Hiroshi Sato, Sodegaura (JP); Yasuyuki Takeda, Sodegaura (JP); Kazuhiko Yoshida, Sodegaura (JP)

(73) Assignee: Nippon Steel Chemical Co., Ltd., Tokyo (JP)

(*) Notice: Subject to any disclaimer, the term of this patent is extended or adjusted under 35 U.S.C. 154(b) by 0 days.

(21) Appl. No.: 11/991,299

(22) PCT Filed: Aug. 23, 2006

(86) PCT No.: PCT/JP2006/316496

§ 371 (c)(1),
(2), (4) Date: Nov. 3, 2008

(87) PCT Pub. No.: WO2007/029503

PCT Pub. Date: Mar. 15, 2007

(65) Prior Publication Data

US 2009/0215969 A1    Aug. 27, 2009

(30) Foreign Application Priority Data

Sep. 2, 2005   (JP) ............................. 2005-254639

(51) Int. Cl.
*F21V 9/00* (2006.01)
*H01L 27/15* (2006.01)
*C08F 20/00* (2006.01)

(52) U.S. Cl. ...................... 252/582; 525/449; 528/365; 528/366; 522/170; 257/79

(58) Field of Classification Search ................. 525/449; 528/365, 366; 522/170; 252/582; 257/79
See application file for complete search history.

(56) References Cited

U.S. PATENT DOCUMENTS

| 5,106,947 | A | * | 4/1992 | Maurer et al. ............... 528/361 |
| 5,505,895 | A | * | 4/1996 | Bull et al. .................... 264/327 |
| 2006/0009547 | A1 | * | 1/2006 | Maeshima et al. .......... 523/427 |
| 2006/0194920 | A1 | * | 8/2006 | Capote et al. ............... 524/779 |

FOREIGN PATENT DOCUMENTS

| JP | 02-296820 | | 12/1990 |
| JP | 06248050 | A * | 9/1994 |
| JP | 06329956 | A * | 11/1994 |
| JP | 07196952 | A * | 8/1995 |
| JP | 09025435 | A * | 1/1997 |
| JP | 11080506 | A * | 3/1999 |
| JP | 3537119 | | 7/1999 |
| JP | 3415047 | | 5/2000 |
| JP | 2000302839 | A * | 10/2000 |
| JP | 2003147176 | A * | 5/2003 |
| JP | 2003-277473 | | 10/2003 |
| JP | 2004-162001 | | 6/2004 |
| JP | 2005042105 | A * | 2/2005 |
| JP | 2005-225964 | | 8/2005 |
| JP | 2006036862 | A * | 2/2006 |
| WO | WO 9620968 | A1 * | 7/1996 |

OTHER PUBLICATIONS

STN Registry Nos. 80-04-6, 85-42-7, 105-08-8, 1455-42-1, 1687-30-5, 13410-58-7, 25550-51-0, 26283-70-5, 82476-50-4, Nov. 16, 1984.*

* cited by examiner

*Primary Examiner*—Douglas Mc Ginty
(74) *Attorney, Agent, or Firm*—Edwards Angell Palmer & Dodge LLP

(57) ABSTRACT

Disclosed is an epoxy resin composition which is solid at ordinary room temperature, cures with excellent light resistance and heat resistance and minimal shrinkage, and is useful for encapsulating LEDs. The epoxy resin composition is characterized by comprising as an essential component an epoxy resin having an epoxy equivalent of 300-1000 g/eq and a softening point of 65-110° C. obtained by reacting a nonaromatic polycarboxylic acid (A) having an acid value of 100-250 mgKOH/g with a nonaromatic epoxy resin (B) having an epoxy equivalent of 100-400 g/eq. The nonaromatic polycarboxylic acid (A) may be obtained by reacting 1,4-cyclohexanedimethanol, 2,2-bis(4-hydroxycyclohexyl)propane, or 3,9-bis(1,1-dimethyl-2-hydroxyethyl)-2,4,8,10-tetraoxaspiro[5,5]undecane with methylhexahydrophthalic acid or hexahydrophthalic acid.

9 Claims, No Drawings

EPOXY RESIN COMPOSITION

FIELD OF TECHNOLOGY

This invention relates to an epoxy resin composition which shows excellent transparency, weather resistance, and heat resistance and is useful in the areas of resins for paints, coating materials, printing inks, resist inks, adhesives, encapsulating materials for semiconductors, molding materials, casting materials, and electrical insulating materials and, particularly, it relates to an epoxy resin composition suitable for encapsulating light-emitting diodes (hereinafter referred to as LED) and an epoxy resin useful therefor.

BACKGROUND TECHNOLOGY

Epoxy resins are used mainly in many applications relating to paints, civil engineering works, and electrical works for their excellent electrical properties, adhesive properties, heat resistance, and the like. In particular, aromatic epoxy resins such as bisphenol A diglycidyl ether, bisphenol F diglycidyl ether, phenol novolak epoxy resins and cresol novolak epoxy resins show excellent water resistance, adhesive properties, mechanical properties, heat resistance, electrical insulating properties, and economics and are used widely in combination with a variety of curing agents. However, these resins degrade easily by the action of ultraviolet rays and the like as they contain aromatic rings and have been restricted in applications requiring light resistance.

In the rapid-growing area of LED devices, aromatic epoxy resin compositions are used at times as an encapsulating material in the fabrication of devices not involving ultraviolet rays nor blue light in consideration of heat resistance, adhesive properties, and light resistance. However, developmental works are under way to raise the output of LED devices by the use of ultraviolet rays or blue light and, if an aromatic epoxy resin composition were used as an encapsulating material, such an encapsulant would degrade because of a deficiency in resistance to ultraviolet rays or blue light and turn yellow with the lapse of time to lower the brightness of LED devices.

The prior-art documents relating to this invention are listed below.

Patent document 1: JP3537119 B

Patent document 2: JP3415047 B

Patent document 3: JP2003-27774732 A

Epoxy resin compositions for use as electrical and electronic materials comprising hydrogenated epoxy resins obtained by hydrogenating aromatic epoxy resins and curing agents are proposed in the patent document 1. Curable epoxy resin compositions comprising hydrogenated epoxy resins obtained by hydrogenating aromatic epoxy resins, cyclic aliphatic epoxy resins, and curing agents are proposed in the patent document 2. Epoxy resin compositions for encapsulating LEDs are proposed in the patent document 3; the compositions comprise hydrogenated epoxy resins having an epoxy equivalent of 230-1000 g/eq obtained by hydrogenating aromatic epoxy resins or epoxy resins having an epoxy equivalent of 230-1000 g/eq obtained by reacting hydrogenated epoxy resins obtained by hydrogenating aromatic epoxy resins with polycarboxylic acids, alicyclic epoxy resins obtained by epoxidizing cyclic olefins, and acid anhydride-based curing agents or cationic polymerization initiators. Although the proposed resin compositions produce a certain improvement in light resistance and heat resistance, there is a demand for epoxy resin compositions that shrink less on curing and show more improved light resistance. Furthermore, depending upon the method of molding, there is another demand for resin compositions of good curability, light resistance, and heat resistance that are solid at ordinary room temperature and become fluid on heating.

DISCLOSURE OF THE INVENTION

Problems to be Solved by the Invention

An object of this invention is to provide an epoxy resin composition which is solid at ordinary room temperature, shows excellent light resistance and heat resistance, cures with minimal shrinkage, and is useful in the areas of paints, inks, resist inks, adhesives, and electronic materials, particularly, in the areas of encapsulating materials for LEDs and to provide an epoxy resin useful therefor.

Means to Solve the Problems

This invention relates to an epoxy resin having an epoxy equivalent of 300-1000 g/eq and a softening point of 65-110° C. obtained by reacting a nonaromatic polycarboxylic acid (A) having an acid value of 100-250 mgKOH/g with a nonaromatic epoxy resin (B) having an epoxy equivalent of 100-400 g/eq, to an epoxy resin composition comprising the said epoxy resin as an essential component, and to a cured resin obtained by curing the said epoxy resin composition. The epoxy resin composition preferably comprises an epoxy resin curing agent for which an acid anhydride is suitable.

A preferable example of the nonaromatic polycarboxylic acid (A) is a polycarboxylic acid obtained by reacting an alcohol mainly composed of one kind or more selected from 1,4-cyclohexanedimethanol, 2,2-bis(4-hydroxycyclohexyl)propane, and 3,9-bis(1,1-dimethyl-2-hydroxyethyl)-2,4,8,10-tetraoxaspiro[5,5]undecane with an acid mainly composed of one kind or more selected from methylhexahydrophthalic acid, hexahydrophthalic acid, and acid anhydrides thereof.

A preferable example of the nonaromatic epoxy resin (B) is an epoxy resin having an epoxy equivalent of 100-400 g/eq which comprises 0-80 wt % of one kind or more selected from 2,2-bis(4-hydroxycyclohexyl)propane diglycidyl ether and 1,4-methoxycyclohexane diglycidyl ether and 20-100 wt % of alicyclic epoxy resins obtained by epoxidizing cyclic olefins.

The epoxy resin of this invention (hereinafter referred to as epoxy resin (E)) is an epoxy resin having an epoxy equivalent of 300-1000 g/eq and a softening point of 65-110° C. obtained by reacting a nonaromatic polycarboxylic acid (A) with a nonaromatic epoxy resin (B) having an epoxy equivalent of 100-400 g/eq. The epoxy resin composition of this invention comprises epoxy resin (E) as an essential component.

The epoxy resin (E) is explained below.

The nonaromatic polycarboxylic acid (A) may be any aliphatic polycarboxylic acid (including any of alicyclic polycarboxylic acids) or hydrogenated aromatic polycarboxylic acid as long as it is free of carbon-carbon double bonds and its acid value is 100-250 mgKOH/g. The nonaromatic polycarboxylic acid (A) is preferably a partially esterified nonaromatic polycarboxylic acid (hereinafter referred to as nonaromatic polycarboxylic acid (A1)) obtained by reacting an aliphatic polycarboxylic acid (A2) with an aliphatic alcohol (including an alicyclic alcohol); the ester linkage here acts to increase the molecular weight and adjust the acid value. The term nonaromatic is understood to be free of carbon-carbon double bonds and so is the term aliphatic (including alicyclic). Preferably, the term nonaromatic means alicyclic here.

Examples of polycarboxylic acids (A2) to be used for the production of nonaromatic polycarboxylic acids (A1) are aliphatic polycarboxylic acids and aromatic polycarboxylic acids whose carbon-carbon double bonds are hydrogenated. Preferred examples are methylhexahydrophthalic acid and hexahydrophthalic acid. Additional examples of polycarboxylic acids (A2) are the acid anhydrides and acid halides of nonaromatic polycarboxylic acids. Methylhexahydrophthalic acid anhydride is commercially available as Rikacid MH (manufactured by New Japan Chemical Co., Ltd.) or HN-5500 (manufactured by Hitachi Chemical Co., Ltd.) while hexahydrophthalic acid anhydride is commercially available as Rikacid HH (manufactured by New Japan Chemical Co., ltd.).

The aliphatic alcohols useful for the production of the nonaromatic polycarboxylic acids (A1) include monohydric and polyhydric alkanols and alcohols obtained by hydrogenating the carbon-carbon double bonds in bisphenols. Preferable examples are 1,4-cyclohexanedimethanol, 2,2-bis(4-hydroxycyclohexyl)propane, and 3,9-bis(1,1-dimethyl-2-hydroxyethyl)-2,4,8,10-tetraoxaspiro[5,5]undecane; 1,4-cyclohexanedimethanol is commercially available as SKY CHDM (manufactured by New Japan Chemical Co., Ltd.), 2,2-bis(4-hydroxycyclohexyl)propane as Rikabinol HB (manufactured by New Japan Chemical Co., Ltd.), and 3,9-bis(1,1-dimethyl-2-hydroxyethyl)-2,4,8,10-tetraoxaspiro[5,5]undecane as Sproglycol (manufactured by Japn Finechem Company, Inc.).

Preferable examples of aliphatic alcohols and polycarboxylic acids (A2) for constituting nonaromatic polycarboxylic acids (A1) are shown below.

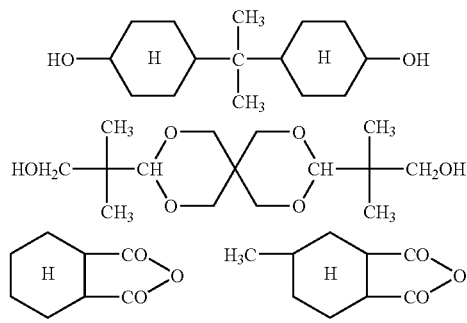

A nonaromatic polycarboxylic acid (A1) is obtained by reacting an aliphatic polycarboxylic acid (A2) or acid anhydride thereof with an aliphatic alcohol and the method for its production is not restricted. This polycarboxylic acid may be obtained advantageously by reacting an alcohol having a cyclohexane structure such as 1,4-cyclohexanedimethanol, 2,2-bis(4-hydroxycyclohexyl)propane, and 3,9-bis(1,1-dimethyl-2-hydroxyethyl)-2,4,8,10-tetraoxaspiro[5,5]undecane or an alcohol containing 30 wt % or more, preferably 50 wt % or more, of the foregoing with an acid containing 30 wt % or more, preferably 50 wt % or more, of one kind or more selected from methylhexahydrophthalic acid, hexahydrophthalic acid, and acid anhydrides thereof so that the resins produced from the polycarboxylic acid may satisfy the requirements for the properties such as optical properties, heat resistance of cured articles, and existence as a solid at ordinary room temperature. The ratio of alcohol to acid or the molar ratio of OH to COOH (one mole of acid anhydride group equals 2 moles of COOH in calculation) is preferably in the range of 1:1.8 to 1:2.2 in consideration of heat resistance and light resistance of cured articles. That is, the acid is used in excess of the theoretical amount to produce a polycarboxylic acid having ester linkages and terminal carboxyl groups thereby satisfying the aforementioned acid value. It is allowable to use an ordinary unesterified polycarboxylic acid as a nonaromatic polycarboxylic acid (A) in place of or together with a nonaromatic polycarboxylic acid (A1). In the case where the nonaromatic polycarboxylic acid (A) is a mixture, it is satisfactory if the mixture has a mean acid value in the aforementioned range.

The nonaromatic epoxy resin (B) to be reacted with the nonaromatic polycarboxylic acid (A) is free of carbon-carbon double bonds and has an epoxy equivalent of 100-400 g/eq. Examples include aliphatic epoxy resins derived from aliphatic polyhydric alcohols, epoxy resins obtained by epoxidizing cyclic olefins, and aliphatic epoxy resins derived from bisphenols by hydrogenating the carbon-carbon double bonds in the ring. So long as the epoxy resins have a structure such as these examples possess, the method for producing them is not restricted. Preferred is an epoxy resin comprising 0-80 wt % of one kind or more epoxy resins (B1) selected from 2,2-bis(4-hydroxycyclohexyl)propane diglycidyl ether and 1,4-methoxycyclohexane diglycidyl ether and 20-100 wt % of alicyclic epoxy resins (B2) obtained by epoxidizing cyclic olefins.

In the case where the nonaromatic epoxy resin (B) is a mixture of an epoxy resin (B1) and an aliphatic epoxy resin (B2), such a mixture preferably consists of 2-80 wt % of epoxy resin (B1) and 20-98 wt % of alicyclic epoxy resin (B2). When the proportion of aliphatic epoxy resin (B2) is less than 20%, the heat resistance deteriorates. When the proportion of aliphatic epoxy resin (B2) exceeds 98%, the melt viscosity increases so that the resin becomes difficult to handle at the time of curing. In the case where the nonaromatic epoxy resin (B) is a mixture of two kinds or more of nonaromatic epoxy resins, the epoxy equivalent of the mixture is preferably in the range of 100-400 g/eq.

It is allowable to use HBPADGE (manufactured by Maruzen Petrochemical Co., Ltd.) or ST-3000 (manufactured by Tohto Kasei Co., Ltd.) for 2,2-bis(4-hydroxycyclohexyl)propane diglycidyl ether and ZX-1658 (manufactured by Tohto Kasei Co., Ltd.) for methoxycyclohexane diglycidyl ether. Preferable examples of epoxy resins (B1) are shown below.

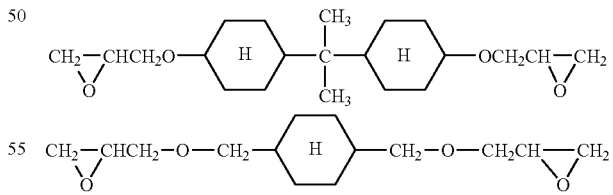

The alicyclic epoxy resin (B2) is an epoxy resin having one or more epoxy groups obtained by epoxidizing a compound having a cyclohexene ring and has an epoxy equivalent of 100-300 g/eq, preferably 100-200 g/eq. The epoxy resins represented by the following formulas (1) and (2) may be used as an alicyclic epoxy resin (B2). The epoxy resin represented by formula (1) or (2) is commercially available as Celloxide 2021P or Celloxide 3000 (manufactured by Daicel Chemical Industries, Ltd.). Other epoxy resins obtained by epoxidizing aliphatic compounds containing an unsaturated ring such as cyclohexene may be used as well.

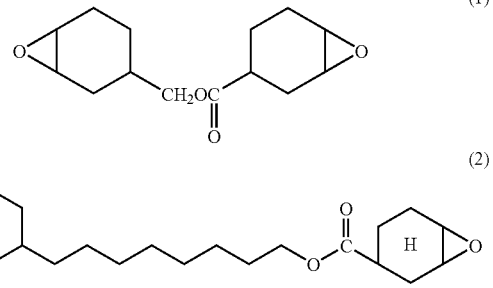

(1)

(2)

The epoxy resin (E) obtained by reacting a nonaromatic polycarboxylic acid (A) with a nonaromatic epoxy resin (B) has an epoxy equivalent of 300-1000 g/eq, preferably 350-700 g/eq, and a softening point of 65-110° C. When the epoxy equivalent is less than 300 g/eq, the resin shrinks excessively during curing and the toughness of the cured article drops. When the epoxy equivalent exceeds 1000 g/eq, the cured article shows a lower glass transition temperature and lower heat resistance. It is possible to control the epoxy equivalent of epoxy resin (E) relatively freely by adjusting the kind of nonaromatic polycarboxylic acid (A) and nonaromatic epoxy resin (B) and the ratio of the two functional groups.

The softening point of epoxy resin (E) varies with the kind of polycarboxylic acid (A), the kind of epoxy resin (B), and the molar ratio of polycarboxylic acid (A) to epoxy resin (B) and it can be controlled easily by controlling these factors. An epoxy resin (E) with a softening point of below 65° C. readily undergoes blocking while the one with a softening point above 110° C. shows a low flow upon heating and is difficult to mold.

The reaction of a nonaromatic polycarboxylic acid (A) with a nonaromatic epoxy resin (B) can be carried out easily in the presence of a catalyst at 120-180° C. Although there is no restriction on the catalyst, a phosphorus compound, 1,8-diazabicyclo(5.4.0)-undecene-7 and salts thereof may be used advantageously. The phosphorus compounds include triphenyl phosphate, tri-tert-butylphosphine, n-butyltriphenylphosphonium bromide, tetra-n-butylphosphonium, and O,O-diethyl phosphorodithioate. The reaction of the COOH group in the nonaromatic polycarboxylic acid (A) with the epoxy group in the nonaromatic epoxy resin (B) proceeds as shown by equation (I). Some of the epoxy groups must remain unreacted after the reaction so that the epoxy resin (E) may have an epoxy equivalent of 300-1000 mg/eq. To attain this end, the ratio of epoxy group to COOH is preferably controlled in the range of 2/1 to 5/1. Under this condition, the epoxy groups partially react in the reaction shown by equation (I) and excess epoxy groups remain intact. Although equation (I) is simplified to show the main reaction, the reaction of a polycarboxylic acid with a polyfunctional epoxy resin can be understood by analogy with equation (I).

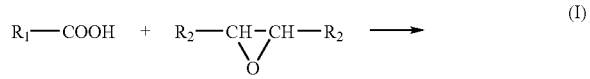

(I)

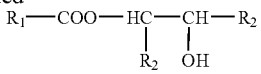

The epoxy resin composition of this invention comprises epoxy resin (E) as an essential component and a curing agent used for epoxy resins is normally incorporated. Further, it is allowable to incorporate an additive such as a cationic polymerization initiator, antioxidant, ultraviolet absorber, and the like.

Although curing agents known for epoxy resins can be used, acid anhydrides are preferred and, concretely, nonaromatic acid anhydrides such as tetrahydrophthalic anhydride, methyltetrahydrophthalic anhydride, and hydrogenated methyl nadic anhydride are preferred for their good light resistance and heat resistance. Further, it is possible to improve the heat resistance and optical properties by addition of inorganic substances, colorants, and the like.

The cured article of the epoxy resin of this invention is obtained by heat curing of the epoxy resin composition of this invention.

EXAMPLES

This invention will be described in detail below with reference to the examples. The abbreviations in the examples are listed below.

HH: Rikacid HH (manufactured by New Japan Chemical Co., Ltd.)

MH: Rikacid MH (manufactured by New Japan Chemical Co., Ltd.)

HB: Rikabinol HB (manufactured by New Japan Chemical Co., Ltd.)

SKY CHDM: Manufactured by New Japan Chemical Co., Ltd.

HBPADGE: Epoxy equivalent 207 g/eq, hydrolyzable chlorine 170 ppm, total chlorine content 1450 ppm, viscosity 780 mPa·s/25° C.; manufactured by Maruzen Petrochemical Co., Ltd.

2021P: Celloxide 2021P (manufactured by Daicel Chemical Industries, Ltd.)

ST-3000: Manufactured by Tohto Kasei Co., Ltd.

ZX-1658: Manufactured by Tohto Kasei Co., Ltd.

YD-012: Bisphenol A type epoxy resin (manufactured by Tohto Kasei Co., Ltd.)

SG: Spiroglycol (manufactured by Japan Finechem Company, Inc.)

TPP: Triphenyl phosphate

Synthetic Example 1

In a 1-L flask equipped with a thermometer, a condenser, a stirrer, and a continuous dropping device were placed 96 parts by weight of HB and 123 parts by weight of HH while purging the air inside the flask with nitrogen gas and the mixture was stirred at 160° C. for 3 hours to give a polycarboxylic acid having an acid value of 206 mgKOH/g (first reaction). Then, 280 parts by weight of HBPADGE, 75 parts by weight of 2021P, and 0.1 part by weight of TPP were introduced to the flask and the mixture was stirred at 160° C. for 4 hours to give 570 parts by weight of epoxy resin (E1) as a solid (second reaction). The epoxy resin (E1) thus obtained had an epoxy equivalent of 530 g/eq and a softening point of 72° C.

Synthetic Example 2

Following the procedure of Synthetic Example 1, 57 parts by weight of SKY CHDM in place of 96 parts by weight of HB and 133 parts by weight of MH in place of 123 parts by weight of HH were stirred at 160° C. for 3 hours to give a polycarboxylic acid having an acid value of 177 mgKOH/g. Thereafter, 150 parts by weight of ST-3000, 150 parts by weight of 2021P, and 0.1 part by weight of TPP were introduced and the mixture was stirred at 160° C. for 4 hours to give 480 parts by weight of epoxy resin (E2) as a solid.

Synthetic Example 3

The procedure of Synthetic Example 1 was followed with the exception of substituting 80 parts by weight of ZX-1658 for 280 parts by weight of HBPADGE and changing the amount of 2021P from 75 to 170 parts by weight to give 460 parts by weight of epoxy resin (E3) as a solid.

Synthetic Example 4

The procedure of Synthetic Example 1 was followed with the exception of changing the amount of HBPADGE from 280 to 20 parts by weight and the amount of 2021P from 75 to 310 parts by weight to give 540 parts by weight of epoxy resin (E4) as a solid.

Synthetic Example 5

The procedure of Synthetic Example 1 was followed with the exception of changing the amount of 2021P from 75 to 310 parts by weight to give 520 parts by weight of epoxy resin (E5) as a solid.

Synthetic Example 6

The procedure of Synthetic Example 1 was followed with the exception of substituting 134 parts by weight of MH for 123 parts by weight of HH and 200 parts by weight of ZX-1658 for 280 parts by weight of HBPADGE and changing the amount of 2021P from 75 to 20 parts by weight to give 440 parts by weight of epoxy resin (E6) as a solid.

Synthetic Example 7

The procedure of Synthetic Example 1 was followed with the exception of substituting 122 parts by weight of SG for 96 parts by weight of HB and changing the amount of HBPADBE from 280 to 168 parts by weight and the amount of 2021P from 75 to 208 parts by weight to give 600 parts by weight of epoxy resin (E7) as a solid. The epoxy resin thus obtained had an epoxy equivalent of 403 g/eq and a softening point of 75° C.

The reaction conditions in Synthetic Examples 1 to 7 and the properties of the epoxy resins are shown in Table 1. The amounts of the reactant monomers are expressed in terms of parts by weight.

TABLE 1

|  | Synthetic example | | | | | | |
| --- | --- | --- | --- | --- | --- | --- | --- |
|  | 1 | 2 | 3 | 4 | 5 | 6 | 7 |
| HB | 96 |  | 96 | 96 | 96 | 96 |  |
| SKY CHDM |  | 57 |  |  |  |  |  |
| SG |  |  |  |  |  |  | 122 |
| HH | 123 |  | 123 | 123 | 123 |  | 123 |
| MH |  | 133 |  |  |  | 134 |  |
| Conditions of 1st reaction |  |  |  | 160° C. 3 h |  |  |  |
| Polycarboxylic acid acid value mgKOH/g | 206 | 177 | 206 | 206 | 206 | 195 | 185 |
| HBPADGE | 280 |  |  | 20 |  |  | 168 |
| ST-3000 |  | 150 |  |  |  |  |  |
| ZX-1658 |  |  | 80 |  |  | 200 |  |
| 2021P | 75 | 150 | 170 | 310 | 310 | 20 | 208 |
| TPP | 0.1 | 0.1 | 0.1 | 0.1 | 0.1 | 0.1 | 0.1 |
| Conditions of 2nd reaction |  |  |  | 160° C. 4 h |  |  |  |
| Epoxy resin | (E1) | (E2) | (E3) | (E4) | (E5) | (E6) | (E7) |
| Epoxy equivalent g/eq | 530 | 500 | 480 | 401 | 450 | 630 | 403 |
| Softening point ° C. | 72 | 85 | 85 | 100 | 105 | 60 | 75 |
| Melt viscosity 150° C. Pa·s | 0.52 | 0.70 | 2.30 | 5.70 | 30.5 | 0.55 | 0.80 |

Examples 1-6 and Comparative Examples 1-5

As shown in Tables 2 and 3, epoxy resins (E1) to (E7), YD-012, St-3000, HBPADGE, and 2021P were respectively mixed thoroughly with HH at a molar ratio 1/1 and defoamed at 110° C. and further mixed with 0.2 part by weight of an antioxidant (SANKO-HCA, manufactured by Sankosha Co., Ltd.) and 0.5 part by weight of a curing accelerator (U-CAT SA-102, manufactured by SAN-APRO Ltd.) to prepare epoxy resin compositions. Each composition was cured in a mold first at 100° C. for 4 hours and then at 140° C. for 12 hours to prepare a 4 mm-thick plate of cured resin.

The resin plate was tested for the glass transition temperature (Tg), light transmission, heat resistance, weather resistance, and shrinkage on curing.

1) The glass transition temperature of the cured resin was determined with the aid of a PerkinElmer differential scanning calorimeter, Delta Series DSC 7, at a rate of temperature rise of 10° C./min.

2) Initial light transmission of the 4 mm-thick cured resin was measured with a self-recording spectrophotometer, Model U-3410 manufactured by Hitachi, Ltd. at 400 nm.

3) The cured resin was held in air at 150° C. for 72 hours and then measured for light transmission at 400 nm in the same manner as for initial light transmission.

4) The cured resin was irradiated with ultraviolet rays for 600 hours in a QUV weathering tester manufactured by Q-Lab Corporation and its light transmission was measured at 400 nm in the same manner as for initial light transmission. The lamp used for the QUV weathering tester was a UVA-340 lamp and the black panel temperature was set at 55° C.

5) The shrinkage on curing of the cured resin was calculated from the thickness of the mold, the thickness of the cured resin, and the area over which shrinkage occurred.

TABLE 2

|  |  | Example | | | | | |
|---|---|---|---|---|---|---|---|
|  |  | 1 | 2 | 3 | 4 | 5 | 6 |
| Epoxy resin | (E1) | 100 |  |  |  |  |  |
|  | (E2) |  | 100 |  |  |  |  |
|  | (E3) |  |  | 100 |  |  |  |
|  | (E4) |  |  |  | 100 |  |  |
|  | (E5) |  |  |  |  | 100 |  |
|  | (E7) |  |  |  |  |  | 100 |
| HH |  | 29.1 | 30.8 | 32.2 | 38.4 | 34.2 | 38.2 |
| Cured resin, Tg ° C. |  | 140 | 135 | 150 | 170 | 180 | 160 |
| Light transmission (%) |  |  |  |  |  |  |  |
| Initial |  | 92 | 91 | 92 | 93 | 91 | 93 |
| After heating |  | 70 | 80 | 83 | 84 | 80 | 81 |
| After UV irradiation |  | 75 | 74 | 73 | 76 | 65 | 78 |
| Shrinkage on curing (%) |  | 0.2 | 0.2 | 0.2 | 0.2 | 0.4 | 0.2 |

TABLE 3

|  | Comparative Example | | | | |
|---|---|---|---|---|---|
|  | 1 | 2 | 3 | 4 | 5 |
| Epoxy resin (E6) | 100 |  |  |  |  |
| ST-3000 |  | 100 |  |  |  |
| HBPADGE |  |  | 100 |  |  |
| YD-012 |  |  |  | 100 |  |
| 2021P |  |  |  |  | 100 |
| HH | 24.4 | 70.0 | 76.7 | 23.4 | 118.5 |
| Cured resin, Tg ° C. | 90 | 98 | 113 | 118 | 200 |
| Light transmission (%) |  |  |  |  |  |
| Initial | 92 | 92 | 88 | 89 | 88 |
| After heating | 20 | 32 | 42 | 80 | 80 |
| After UV irradiation | 67 | 58 | 54 | 30 | 60 |
| Shrinkage on curing (%) | 0.3 | 1.0 | 1.8 | 0.2 | 2.0 |

INDUSTRIAL APPLICABILITY

The epoxy resin composition of this invention is solid at ordinary room temperature, cures with excellent transparency, light resistance, heat resistance, and resistance to shrinkage on curing, and is useful for paints, inks, resist inks, adhesives, and electronic materials, particularly useful for LEDs.

What is claimed is:

1. An epoxy resin having an epoxy equivalent of 300-1000 g/eq and a softening point of 65-110° C. obtained by reacting a nonaromatic polycarboxylic acid (A) having an acid value of 100-250 mgOH/g with a nonaromatic epoxy resin (B) having an epoxy equivalent of 100-400 g/eq;
wherein the nonaromatic epoxy resin (B) comprises 2-80 wt % of one kind or more selected from 2,2-bis(4-hydroxycyclohexyl)propane diglycidyl ether and 1,4-methoxycyclohexane diglycidyl ether and 20-98 wt % of alicyclic epoxy resins obtained by epoxidizing cyclic olefins.

2. An epoxy resin composition comprising as an essential component an epoxy resin having an epoxy equivalent of 300-1000 g/eq and a softening point of 65-110° C. obtained by reacting a nonaromatic polycarboxylic acid (A) having an acid value of 100-250 mgOH/g with a nonaromatic epoxy resin (B) having an epoxy equivalent of 100-400 g/eq;
wherein the nonaromatic epoxy resin (B) comprises 2-80 wt % of one kind or more selected from 2,2-bis(4-hydroxycyclohexyl)propane diglycidyl ether and 1,4-methoxycyclohexane diglycidyl ether and 20-98 wt % of alicyclic epoxy resins obtained by epoxidizing cyclic olefins.

3. An epoxy resin composition as described in claim 2 wherein the nonaromatic polycarboxylic acid (A) is a polycarboxylic acid obtained by reacting an alcohol mainly composed of one kind or more selected from 1,4-cyclohexanedimethanol, 2,2-bis(4-hydroxycyclohexyl)propane, and 3,9-bis(1,1-dimethyl-2-hydroxyethyl)-2,4,8,10-tetraoxaspiro[5,5]undecane with an acid mainly composed of one kind or more selected from methylhexahydrophthalic acid, hexahydrophthalic acid, and acid anhydrides thereof.

4. An epoxy resin composition as described in claim 2 wherein the nonaromatic polycarboxylic acid (A) is a polycarboxylic acid obtained by reacting an alcohol mainly composed of one kind or more selected from 1,4-cyclohexanedimethanol and 2,2-bis(4-hydroxycyclohexyl)propane with an acid mainly composed of one kind or more selected from methylhexahydrophthalic acid, hexahydrophthalic acid, and acid anhydrides thereof.

5. A light-emitting diodes encapsulated by epoxy resin composition as described in claim 2.

6. An epoxy resin composition as described in claim 2 wherein an epoxy resin curing agent based on an acid anhydride is contained.

7. A cured resin obtained by curing the epoxy resin composition described in claim 6.

8. An epoxy resin composition as described in claim 2 wherein the nonaromatic epoxy resin (B) consists of 2-80 wt % of one kind or more selected from 2,2-bis(4-hydroxycyclohexyl)propane diglycidyl ether and 1,4-methoxycyclohexane diglycidyl ether and 20-98 wt % of alicyclic epoxy resins obtained by epoxidizing cyclic olefins.

9. An epoxy resin composition as described in claim 2 wherein the nonaromatic polycarboxylic acid (A) and the nonaromatic epoxy resin (B) are free of carbon-carbon double bonds.

* * * * *